United States Patent
Li et al.

(10) Patent No.: US 7,672,079 B2
(45) Date of Patent: Mar. 2, 2010

(54) POLE WIDTH CONTROL ON PLATED BEVEL MAIN POLE DESIGN OF A PERPENDICULAR MAGNETIC RECORDING HEAD

(75) Inventors: Donghong Li, Fremont, CA (US); Yoshitaka Sasaki, Santa Clara, CA (US)

(73) Assignee: Headway Technologies, Inc., Milpitas, CA (US)

( * ) Notice: Subject to any disclaimer, the term of this patent is extended or adjusted under 35 U.S.C. 154(b) by 736 days.

(21) Appl. No.: 10/886,284

(22) Filed: Jul. 7, 2004

(65) Prior Publication Data

US 2006/0044677 A1    Mar. 2, 2006

(51) Int. Cl.
G11B 5/127    (2006.01)
(52) U.S. Cl. .................. 360/125.02; 360/125.01; 360/125.03
(58) Field of Classification Search .......... 360/313, 360/119, 125, 126, 123
See application file for complete search history.

(56) References Cited

U.S. PATENT DOCUMENTS

| | | | | | |
|---|---|---|---|---|---|
| 4,656,546 | A | * | 4/1987 | Mallory | 360/110 |
| 4,672,493 | A | * | 6/1987 | Schewe | 360/125 |
| 4,970,616 | A | * | 11/1990 | Ramaswamy | 360/122 |
| 5,267,112 | A | * | 11/1993 | Batra et al. | 360/125.42 |
| 5,452,164 | A | * | 9/1995 | Cole et al. | 360/113 |
| 5,649,351 | A | * | 7/1997 | Cole et al. | 29/603.14 |
| 5,831,801 | A | * | 11/1998 | Shouji et al. | 360/125.64 |
| 6,198,597 | B1 | * | 3/2001 | Tateyama et al. | 360/125.5 |
| 6,282,056 | B1 | * | 8/2001 | Feng et al. | 360/125.43 |
| 6,504,675 | B1 | * | 1/2003 | Shukh et al. | 360/125 |
| 6,510,024 | B2 | * | 1/2003 | Otsuka et al. | 360/126 |
| 6,710,973 | B2 | * | 3/2004 | Okada et al. | 360/125 |
| 2002/0026704 | A1 | * | 3/2002 | Stageberg et al. | 29/603.12 |
| 2002/0080524 | A1 | * | 6/2002 | Takahashi et al. | 360/126 |
| 2003/0112555 | A1 | * | 6/2003 | Sato et al. | 360/126 |
| 2005/0036237 | A1 | * | 2/2005 | Yazawa et al. | 360/126 |

* cited by examiner

*Primary Examiner*—Andrea L Wellington
*Assistant Examiner*—Carlos E. Garcia
(74) *Attorney, Agent, or Firm*—Saile Ackerman LLC; Stephen B. Ackerman

(57) ABSTRACT

A main pole layer is deposited within an opening in a patterned photoresist layer on a substrate. The photoresist is thinned to expose an upper portion of a pole tip region that is then trimmed to a rectangular shape while a lower portion retains an inverted trapezoidal shape. Thereafter, a second trimming process forms a pole tip with a first width in the upper rectangular portion and a second thickness and second width which is less than the first width in the lower portion. A CMP step subsequently thins the upper portion to a first thickness of 0.04 to 0.08 microns while the second thickness remains at 0.16 to 0.32 microns. The bottom surface of the lower portion along the ABS becomes the trailing edge in a recording operation. The pole tip has a consistent first width (track width) that is not influenced by CMP process variations.

19 Claims, 6 Drawing Sheets

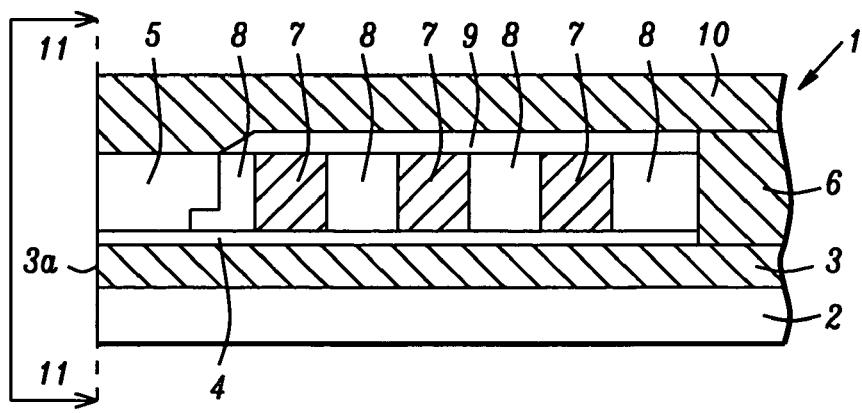
FIG. 1 - Prior Art
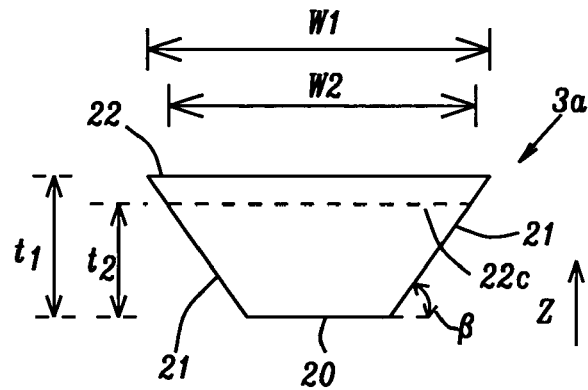
FIG. 2 - Prior Art
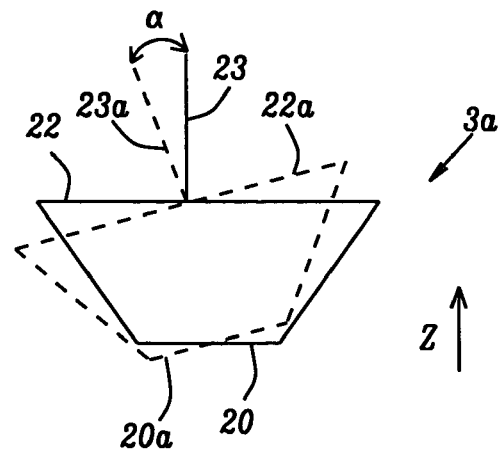
FIG. 3 - Prior Art

POLE WIDTH CONTROL ON PLATED BEVEL MAIN POLE DESIGN OF A PERPENDICULAR MAGNETIC RECORDING HEAD

FIELD OF THE INVENTION

The invention relates to a write pole in a perpendicular magnetic recording head (PMR) and a method for making the same. In particular, a write pole having a rectangular upper portion and a trapezoidal lower portion is used to minimize variations in pole width caused by pole thickness variations.

BACKGROUND OF THE INVENTION

Perpendicular recording has been developed in part to achieve higher recording density than is realized with longitudinal recording devices. A PMR write head typically has a main pole with a small surface area at an air bearing surface (ABS) and a flux return pole (opposing pole) which is magnetically coupled to the main pole and has a large surface area at the ABS. Critical dimensions of the main pole include a neck height and a pole width in a pole tip adjacent to the ABS. Magnetic flux generated in the main pole layer passes through the pole tip into a magnetic media and then back to the write head by entering the flux return pole.

A conventional PMR write head 1 is depicted in FIG. 1. The main pole layer 3 is formed on a substrate 2 that may be an $Al_2O_3$ insulation layer which separates the write head from a read head (not shown) in a separated read/write head. The main pole layer 3 is generally made of a material with a high saturation magnetic flux density (Bs) that terminates in a pole tip also referred to as a write pole 3a at an ABS which is the plane 11-11. There is a first insulation layer 4 on the main pole layer 3 and a second insulation layer 5 on the first insulation layer along the ABS. A coil layer 7 is formed on the first insulation layer 4 and is coplanar with the second insulation layer 5. Coils within the coil layer 7 are insulated by a third insulation layer 8 that may be a photoresist. The third insulation layer 8 and coils formed therein extend from the second insulation layer 5 to a connection region 6 also known as a back gap region that magnetically couples the main pole layer 3 to a flux return pole layer 10. Overlying the coil layer 7 is a fourth insulation layer 9 that separates the coils from the flux return pole.

Referring to FIG. 2, a cross-sectional view of the pole tip 3a from the plane 11-11 is shown. During a recording operation, the pole tip 3a and write head 1 move over a magnetic recording track (not shown) in the z direction. The pole tip 3a usually has an inverted trapezoid shape with sloped sides 21, a top surface 22 that has a pole width (track width) $w_1$ and a bottom surface 20 which has a smaller width than the track width. Each side 21 forms an angle $\beta$ with the bottom surface. The track width is typically determined by an ion milling process that removes excess material from the edges of the main pole layer. However, a subsequent chemical mechanical polish (CMP) process that planarizes the main pole layer 3 is difficult to control and a large variation in the resulting main pole layer thickness may occur. For example, one write head may have a pole tip thickness $t_1$ and track width $w_1$ following the CMP step. On the other hand, a second write head may have a pole tip thickness $t_2$ and track width $w_2$ which are smaller than $t_1$ and $w_1$, respectively, because of a prolonged CMP process time that forms a top surface 22c. The thickness difference $(t_1-t_2)$ caused by CMP process variation will have an adverse impact on device performance since track width and magnetic flux density delivered by the main pole will vary from one write head to the next. Therefore, a method is needed that can produce a write head which has a more consistent pole width dimension that is not influenced by CMP process variations.

Referring to FIG. 3, another concern with a conventional PMR write head during a recording operation is that the pole tip 3a tends to become skewed at an angle $\alpha$ relative to the recording direction z and the magnitude of $\alpha$ can vary depending on the location of the pole tip on the circular magnetic recording media. In some cases where the skew angle $\alpha$ is large or where the undercut angle $\beta$ is significant, undesirable writing can occur on a track adjacent to the intended recording track.

In U.S. Pat. No. 6,504,675, the slope angle of the pole sides is allowed to be greater than the maximum skew angle in order to suppress the skew effect. Alternatively, the trailing write pole is comprised of two parts in which a wide trapezoidal section is formed on a narrow rectangular section that is the leading edge.

A main pole layer with an inverted trapezoidal pole tip is embedded in an inorganic insulation layer in U.S. Pat. No. 6,710,973. A trailing edge, a leading edge, or both lateral edges of the main pole may be tapered in a smooth linear or curved fashion.

In U.S. Pat. No. 6,510,024, an upper magnetic pole is trimmed by an ion milling method in which the incident angle of ion particles is controlled to within a range of 65 to 85 degrees. The upper magnetic pole has a trapezoidal shape in which a bottom surface nearer an adjoining read head has a greater width than a top surface.

A method for forming a pole tip width less than 1 micron is described in U.S. Pat. No. 5,649,351 in which a photoresist layer that is 5 to 10 microns thick is used as an ion milling mask to define a rectangular pole tip in a planar write head. The resulting thin film magnetic write head is disclosed in U.S. Pat. No. 5,452,164.

SUMMARY OF THE INVENTION

One objective of the present invention is to provide a consistent pole width in a main pole layer of a PMR write head that is not influenced by CMP process variations.

Another objective of the present invention is to provide a pole tip region in a main pole layer of a PMR write head that has a rectangular upper portion with a leading edge and a bottom portion with an inverted trapezoidal shape that includes a trailing edge.

A still further objective of the present invention is to provide a method of forming a main pole layer in a PMR write head according to the first two objectives.

According to the present invention, these objectives are achieved in a first embodiment in which a pole tip is formed in a main pole layer of a PMR write head. The pole tip is one end of a pole tip region that is formed on a substrate and is adjacent to an ABS. The other end is adjacent to a front end portion of the main pole layer. The pole tip and pole tip region are comprised of an upper portion that is a rectangular shape having a first width and a first thickness and a lower portion which has an inverted trapezoidal shape having a second thickness. The bottom surface of the upper portion is coincident with the top surface of the lower portion while the bottom surface of the lower portion has a second width that is less than the first width. The top surface of the upper portion is the leading edge and the bottom surface of the lower portion is the trailing edge as the pole tip is moved along the ABS in a recording operation. The sides of the upper portion are aligned perpendicular to a substrate while the lower portion has two sides that intersect the substrate at an angle θ that is about 80 to 85 degrees.

In a second embodiment, the main pole layer is disposed on a bottom yoke and a first insulation layer that have been formed on a substrate. A bottom yoke is formed on the substrate by a conventional method and is recessed from a first plane that will become an ABS in a subsequent step wherein the first plane is perpendicular to the substrate. A main pole layer is formed on the bottom yoke by successive steps that involve depositing a seed layer, patterning a photoresist layer to generate an opening, and depositing the main pole layer in the opening. A key sequence then follows in which the photoresist layer is thinned to a certain thickness below the main pole and a first ion milling process is used to trim an upper portion of the pole tip region to a rectangular shape while the bottom portion adjacent to the photoresist layer retains an inverted trapezoidal shape. After the photoresist layer is removed by a conventional process, a second ion milling process is performed to trim the pole tip region to a targeted pole width in which the upper portion of the pole tip has a first width that is the track width. Meanwhile, the lower portion of the pole tip region and pole tip retains its inverted trapezoidal shape. The top surface of the lower portion is trimmed to the first width and the lower surface is trimmed to a second width that is less than the first width. During the second ion milling process, exposed portions of the seed layer are removed.

Thereafter, a second insulation layer is deposited on the first insulation layer and main pole layer and a CMP step is used to make the second insulation layer coplanar with the main pole layer. A write gap layer is then deposited on the main pole layer and second insulation layer and a connection area is opened over a back end portion of the main pole layer that will enable a subsequently formed first write shield to make contact with the main pole layer. A first write shield is formed by selective plating and a portion thereof covers the connection area and the write gap layer along the first plane and extends a neck height distance from the first plane over the pole tip region. Once a second photoresist layer and underlying seed layer used for the selective plating are removed, a third insulation layer is deposited to fill the opening vacated by stripping the photoresist layer. The third insulation layer and first write shield are planarized simultaneously. The write head is completed by building a second write shield above the first write shield and a coil layer above the third insulation layer followed by forming a photoresist insulation layer to insulate the coils, forming a fourth insulation layer on the coil layer and forming a third write shield on the second write shield and fourth insulation layer.

BRIEF DESCRIPTION OF THE DRAWINGS

FIG. 1 is a cross-sectional view showing a conventional PMR write head that has a main pole layer and a flux return pole.

FIG. 2 is a cross-sectional view of the write head in FIG. 1 from the ABS plane showing an inverted trapezoidal shape of the pole tip in the main pole layer.

FIG. 3 is a cross-sectional view of the conventional pole tip in FIG. 2 that indicates a skew angle in relation to a recording direction.

DETAILED DESCRIPTION OF THE INVENTION

The present invention is a write pole in a PMR write head for use with magnetic storage media in a disk drive. A key feature is a main pole layer in which a pole tip region is comprised of an upper rectangular portion and a lower portion with an inverted trapezoidal shape. The upper portion has a leading edge along an ABS while the lower portion has a trailing edge in a recording operation. The present invention is also a method for forming a consistent pole width in a main pole layer that is not influenced by CMP process variations. The drawings are provided by way of example and are not intended to limit the scope of the invention. Moreover, the elements in the figures are not necessarily drawn to scale and may have different relative sizes in an actual device.

Figure 4:
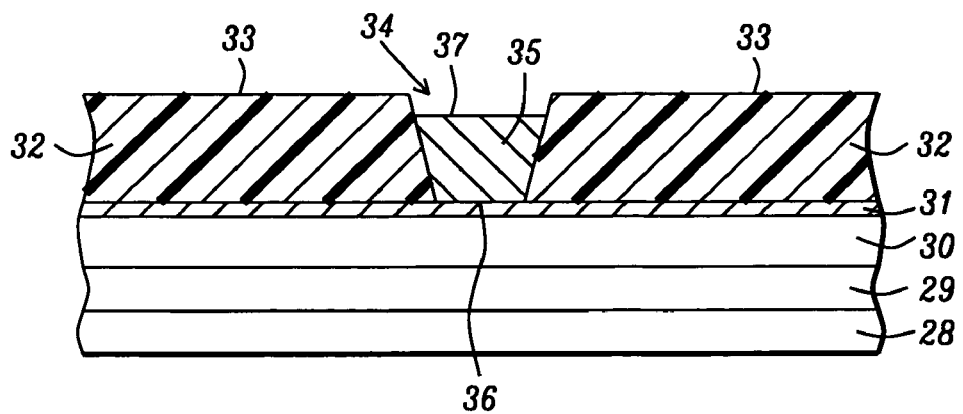
FIG. 4 is a cross-sectional view from the ABS plane showing the formation of a pole tip region in a main pole layer according to the present invention.
Figure 15:
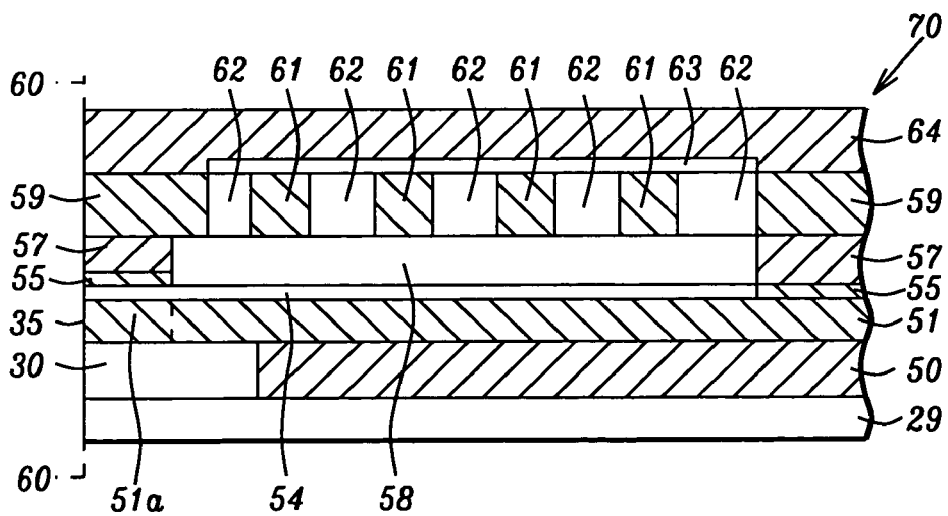
FIG. 15 is a cross-sectional view from a plane perpendicular to the ABS and FIG. 16 is a cross-sectional view from the ABS of the PMR write head formed according to the present invention.
Figure 16:
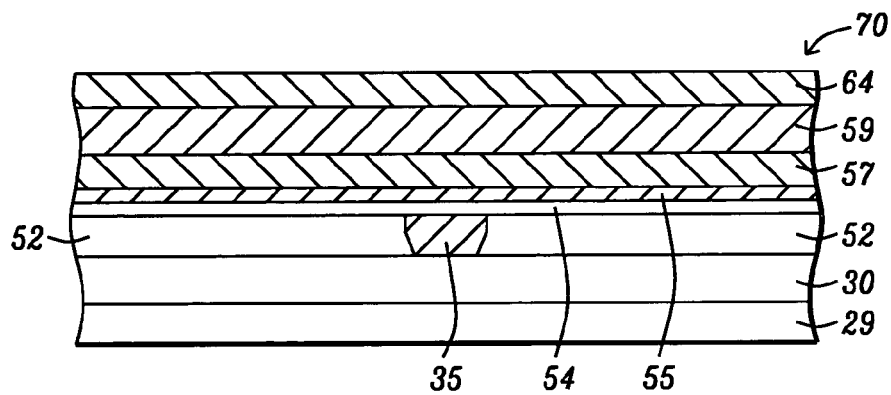
Figure 17:
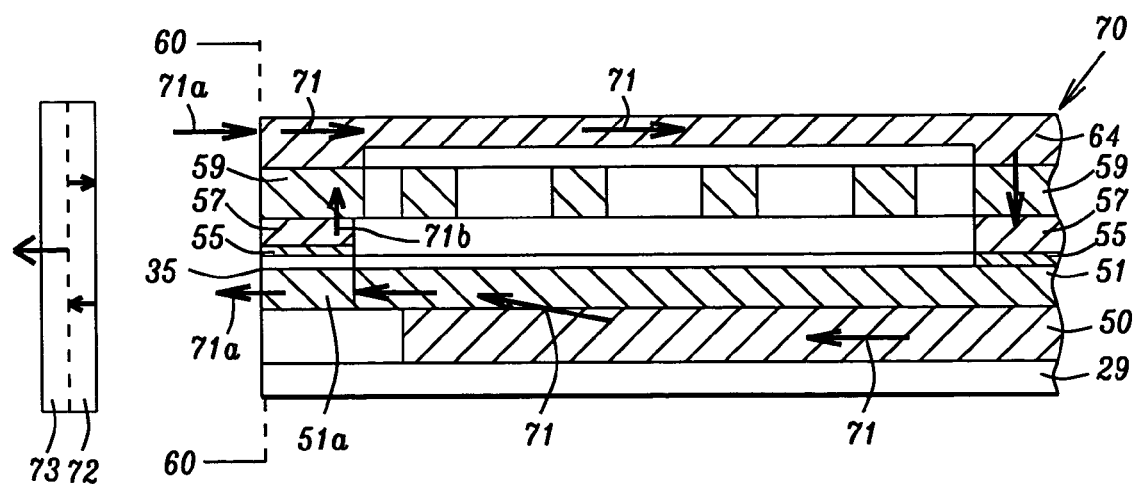
FIG. 17 is a cross-sectional view showing the magnetic flux path in the PMR write head of the present invention.

First a method of forming the pole tip according to the present invention will be described. Referring to FIG. 4, a cross-sectional view is shown from a first plane that will subsequently become an ABS as appreciated by those skilled in the art. There is a substrate 29 that may be a separation layer made of $Al_2O_3$ between a read head 28 and a write head in a separated PMR read-write head, for example. The PMR write head structure 70 is depicted in FIGS. 15-17. It is understood that the substrate may be part of a slider (not shown) formed in an array of sliders on a wafer. After the write head is completed, the wafer is sliced to form rows of sliders. Each row is typically lapped to afford an ABS before dicing to fabricate individual sliders that are used in a magnetic recording device.

In the exemplary embodiment, a bottom yoke (not shown) which is comprised of a material such as CoNiFe and recessed a certain distance from the first plane is formed on the substrate 29 by a standard process such as a sputtering or electroplating method. A first insulation layer 30 is formed on the substrate 29 by a physical vapor deposition (PVD) or chemical vapor deposition (CVD) method and may be comprised of $Al_2O_3$. Next, a planarization step is employed to make the bottom yoke coplanar with the first insulation layer 30.

In one embodiment, a seed layer 31 such as CoNiFe or CoFeN is sputter deposited on the first insulation layer 30 and bottom yoke and has a thickness of about 500 to 1000 Angstroms. A photoresist layer 32 with a thickness of 0.8 to 1.2 microns and preferably 1 micron is patterned on the seed layer 31 to generate an opening 34 that has a tapered profile in which the top is wider than the bottom. The photoresist layer 32 advantageously has a positive tone composition to facilitate a subsequent thinning step. For example, a chemically amplified photoresist (IO362) available from ShinEtsu Chemical Company may be spin coated and baked to form the photoresist layer 32.

The main pole layer which terminates in a pole tip 35 at the first plane is deposited by an electroplating method on the seed layer within the opening 34. Preferably, the top surface 37 of the pole tip (and main pole layer) is below the top surface 33 of the photoresist layer 32. The pole tip 35 also has a bottom surface 36 having a width smaller than that of the top surface 37. The main pole layer is comprised of a material such as CoNiFe or FeCo that has a high saturation magnetic flux density (Bs) and a plated thickness of about 0.7 to 0.9 microns. A more detailed description of the shape of the main pole layer will be provided in a later section. It is understood that the pole tip region extends beyond the first plane (eventual ABS) on the substrate 29 but for the purpose of this discussion, the fabrication is described with regard to a perspective from the first plane as the write head would appear in the final device.

Figure 5:
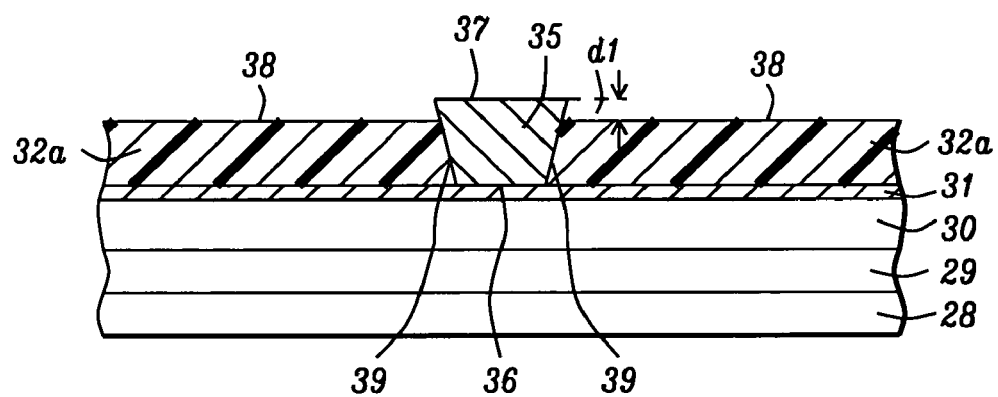
FIG. 5 is a cross-sectional view of the pole tip in FIG. 4 after the thickness of an adjacent photoresist layer is reduced according to the present invention.

Referring to FIG. 5, a key step is the thinning of the photoresist layer 32 to a thickness that is a distance $d_1$ of about 0.3 to 0.5 microns below the top surface 37 of the pole tip 35 and main pole layer. In one aspect, the photoresist layer 32 is thinned by first performing a blanket exposure with an appropriate dose that converts the upper portion of the photoresist layer into an aqueous base soluble matrix but does not transform the lower portion into an aqueous base soluble region. Following the exposure, the substrate 29 is treated with an aqueous base developer that removes the upper portion of the photoresist layer. Alternatively, the photoresist layer 32 may be thinned by a reactive ion etch (RIE) or ion milling method that is well known to those skilled in the art. At this point, the thinned photoresist layer 32a has a top surface 38. Note that each side 39 of the pole tip 35 essentially forms a straight edge. It is understood that the cross-sectional shape of the pole tip region is the similar to that of the pole tip 35 wherein the top surface 37 is wider than the bottom surface 36 and sloped sides 39 connect the top and bottom surfaces. Likewise, subsequent processes that modify the sides of the pole tip also affect the sides (not shown) of the pole tip region in a similar manner unless otherwise stated.

Figure 6:
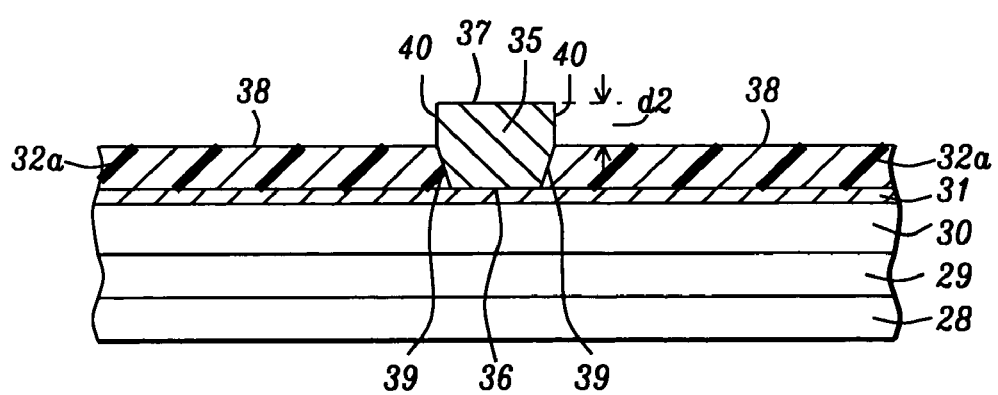
FIG. 6 is a cross-sectional view of the pole tip after an ion milling step forms an upper rectangular portion.

Referring to FIG. 6, another important step in the method of the present invention is a first ion milling step that trims an upper portion of the pole tip 35 which is the region above the top surface 38 of the photoresist layer 32a. The upper portion is trimmed to a rectangular shape that has sidewalls 40 which are perpendicular to the substrate 29. As a result, the width of the top surface 37 is reduced but is still greater than the width of the bottom surface 36. A bottom portion that includes the sidewalls 39 and bottom surface 36 is generally not affected by the ion milling although the photoresist layer 32a and top surface 37 may be thinned by up to 0.1 microns. The distance $d_2$ between the top surface 37 and the top surface 38 of the photoresist layer 32a remains at about 0.3 to 0.5 microns. As a result, the upper rectangular portion has a width w of about 0.18 to 0.24 microns. The first ion milling step may be performed in a process tool from Veeco Company with the following conditions: a fixture angle of about 10° to 20° and a sweep angle of from 85° to 150° for a period of about 1 to 2 minutes.

Figure 7:
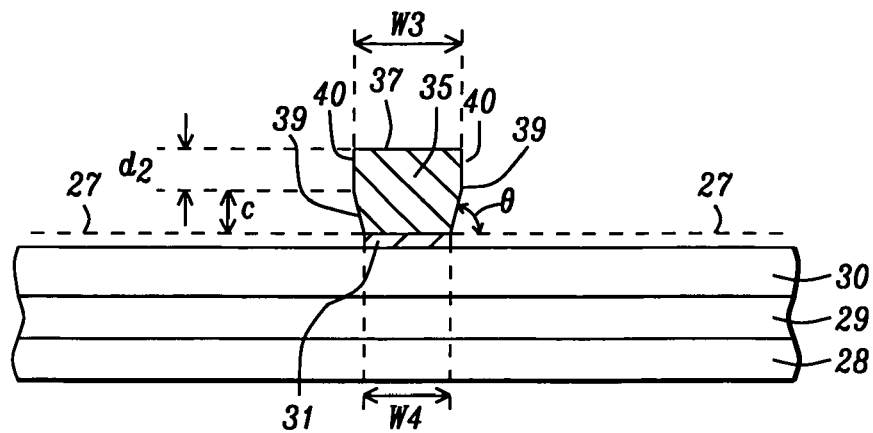
FIG. 7 is a cross-sectional view of the pole tip in FIG. 6 after the adjacent photoresist layer is removed and a pole trimming step is performed.

Referring to FIG. 7, the photoresist layer 32a is removed by a well known method such as with an organic stripper solution or with oxygen ashing. Thereafter, a second ion milling process is performed to further trim the pole tip 35 to a targeted width. In one embodiment, the second ion milling step is comprised of a fixture angle of about 40° to 50° and a sweep angle of from 85° to 150° for a period of about 3 minutes. As a result, the top surface 37 is trimmed to a width $w_3$ of about 0.12 to 0.16 microns which is the track width and the bottom surface 36 is trimmed to a width $w_4$ of about 0.04 to 0.08 microns. The sidewalls 40 of the upper portion remain perpendicular to the substrate 29 and the sidewalls of the lower portion retain a straight edge that forms an angle θ of about 80 to 85 degrees with a plane 28-28 that is coincident with the bottom surface 36. The upper portion of the pole tip 35 formed between the sides 40 has a thickness $d_2$ of about 0.16 to 0.32 microns and the lower portion of the pole tip formed between the sidewalls 39 has a thickness c of about 0.16 to 0.32 microns wherein the ratio of $d_2$ to c is from 2:1 to 1:1. Additionally, exposed portions of the seed layer 31 are removed during the second ion milling process.

Figure 8:
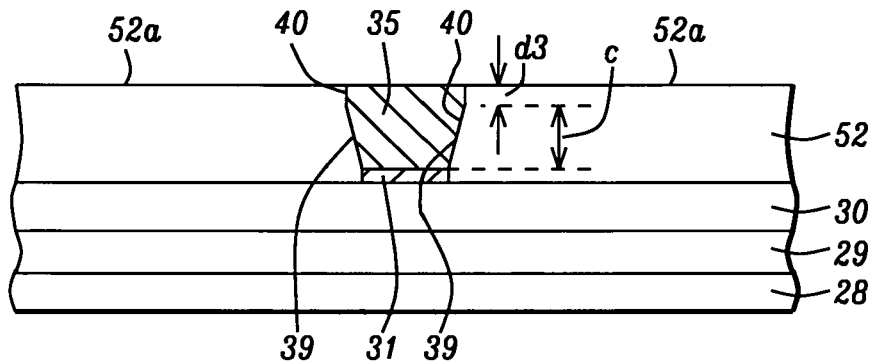
FIG. 8 is a cross-sectional view from the ABS of the pole tip in FIG. 7 after an insulation layer is formed coplanar to the main pole layer.

As shown in FIG. 8, a second insulation layer 52 such as $Al_2O_3$ is deposited on the first insulation layer 30 and is planarized by a CMP process, for instance, to become coplanar with the pole tip 35 and main pole layer which are thinned to a final thickness of about 0.2 to 0.4 microns. Unlike prior art pole tips with an inverted trapezoidal or regular trapezoidal shape, variations in the CMP process do not result in pole tip width variations. In the pole tip of the present invention, the pole tip 35 will consistently have a pole width $w_3$ as long as the CMP process does not thin the pole tip below the sides 40 in the upper portion. That is, the upper surface 52a of the second insulation layer is preferably above the sloped sides 39 of the lower portion of the pole tip by a distance $d_3$ of about 0.04 to 0.08 microns. By maintaining the minimum thickness $d_3$ of the upper portion to greater than 0.04 microns, erosion of the pole tip below the vertical sidewalls 40 is essentially prevented. The thickness of the upper rectangular portion of the pole tip in relation to the thickness of the lower inverted trapezoidal portion is represented by the ratio of $d_3$ to c which is from about 0.12:1 to 0.5:1. Another advantage of the present invention is that the upper rectangular portion of the pole tip helps to prevent writing on adjacent tracks when the pole tip becomes skewed during a write operation.

Figure 9:
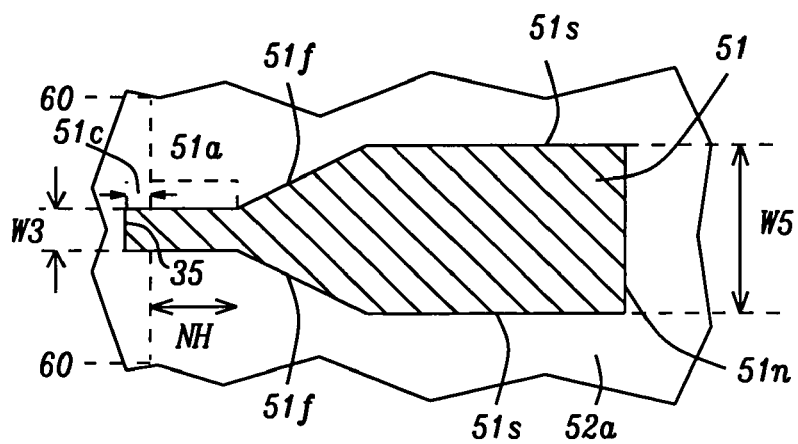
FIG. 9 is a top view that depicts the main pole layer of the present invention on a wafer before a lapping process to form an ABS.

Referring to FIG. 9, a top view of the main pole layer 51 is shown on a substrate before a lapping process that forms a pole tip region with a length NH. During the fabrication process on a wafer, the pole tip region extends beyond the first plane 60-60 as mentioned previously. Besides a pole tip region 51a that has a pole width $w_3$ and a length NH, there is a pole tip region 51c between the first plane 60-60 and the initial pole tip 35 that will be removed later in a lapping process. The pole tip region 51c will not be shown again in FIGS. 10-17 in order to simplify the drawings. The main pole layer 51 is also comprised of a front end region formed between the flaired sides 51f and a back end region formed between the sides 51s that are aligned perpendicular to the first plane 60-60. The sides 5is connect the flared sides 51f with an end 51n that typically has a width $w_5$ of about 10 to 12 microns. The main pole layer 51 is surrounded on all sides by the second insulation layer with a top surface 52a.

Figure 10:
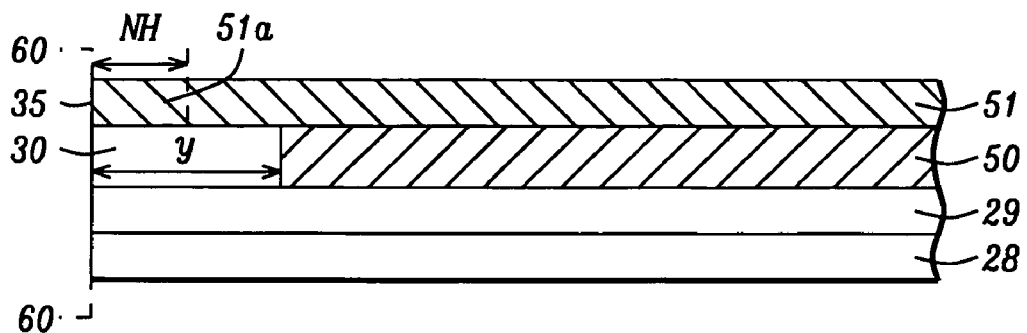
FIG. 10 is a cross-sectional view showing the main pole layer in FIG. 9 formed on a bottom yoke according to a method of the present invention.

Referring to FIG. 10, a cross-sectional view of the partially formed write head in FIG. 9 is shown from a plane that is perpendicular to the first plane 60-60 and bisects the pole tip region 51a and end 51n in the main pole layer 51. In one embodiment, the bottom yoke 50 is recessed by a distance y of about 1 micron from the first plane 60-60 and the NH dimension of the pole tip region is less than y and preferably about 0.1 to 0.3 microns.

Figure 11:
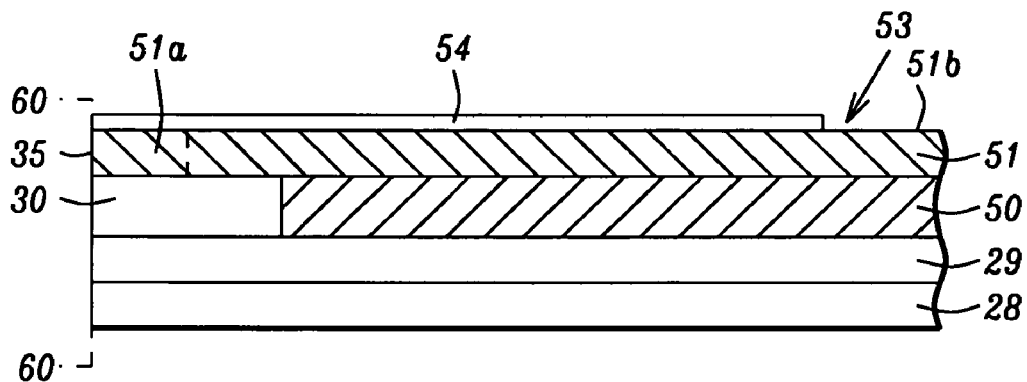
FIGS. 11-13 depict cross-sectional views of successive stages in forming the PMR write head of the present invention.

As shown in FIG. 11, a write gap layer 54 is deposited by a sputtering process or the like on the main pole layer 51, pole tip region 51a, and second insulation layer 52 (not shown). The write gap layer 54 may be an $Al_2O_3$ layer with a thickness of about 500 to 1000 Angstroms and preferably 800 Angstroms. Next, a second photoresist layer (not shown) is patterned on the write gap layer and an ion beam etch (IBE) is employed to expose the top surface 51b of the main pole layer 51 in a so-called connection area within the back end region of the main pole layer. Thereafter, the second photoresist layer is stripped by a conventional method.

Figure 12:
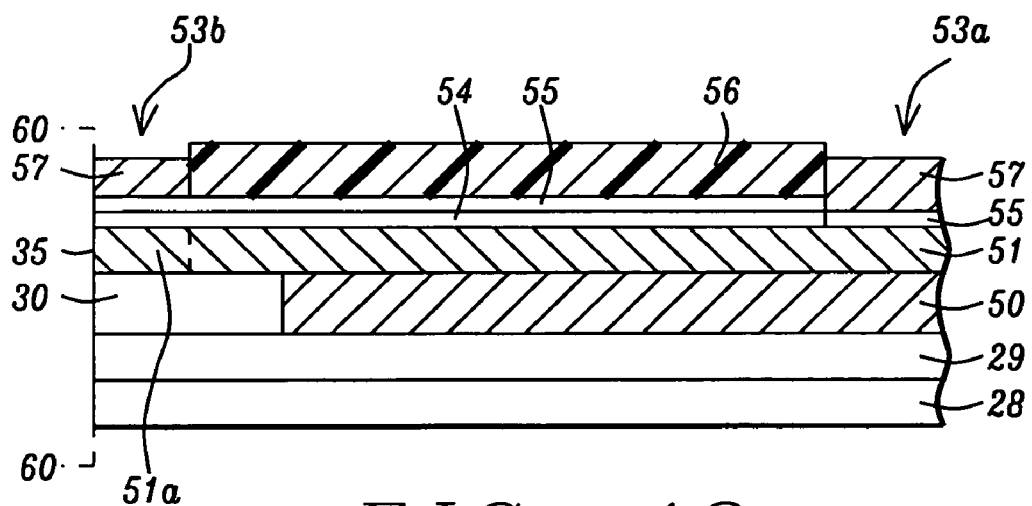

Referring to FIG. 12, a seed layer 55 such as CoNiFe is deposited on the write gap layer 54 and on the top surface 51b of the connection area. A photoresist layer 56 is patterned on the seed layer 55 and has an opening 53a above the top surface 51b of the main pole layer 51 in the connection area and an opening 53b that extends a distance TH from the first plane 60-60 toward the back end of the main pole layer. The seed layer 55 is uncovered at the bottom of the openings. Next, a selective electroplating process is performed as is understood by those skilled in the art which deposits the first write shield 57 on the exposed seed layer 55 in the openings 53a, 53b. The first write shield 57 has a thickness of about 1.0 to 1.5 microns and is preferably comprised of CoNiFe.

Figure 13:
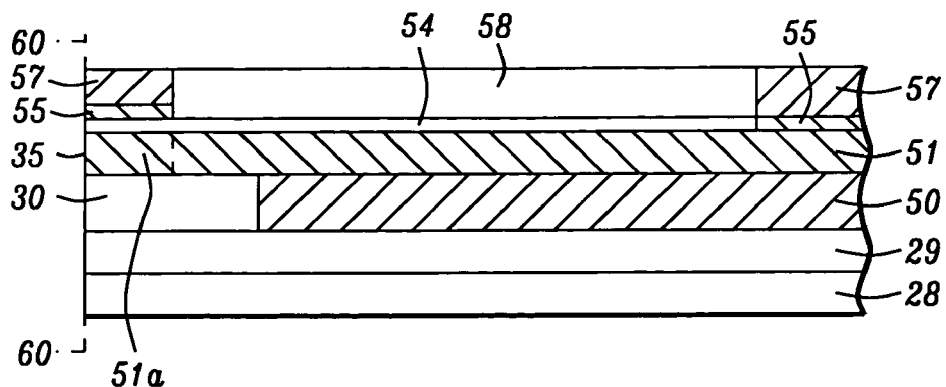

Referring to FIG. 13, the photoresist layer 56 is removed by a standard stripping method and then a third insulation layer 58 may be deposited by a CVD or PVD method to fill the opening vacated by the photoresist layer 56. The third insulation layer 58 may be comprised of $Al_2O_3$. The third insulation layer 58 and first write shield 57 become coplanar after a planarization step such as a CMP process which reduces the first write shield thickness to about 0.5 microns.

Figure 14:
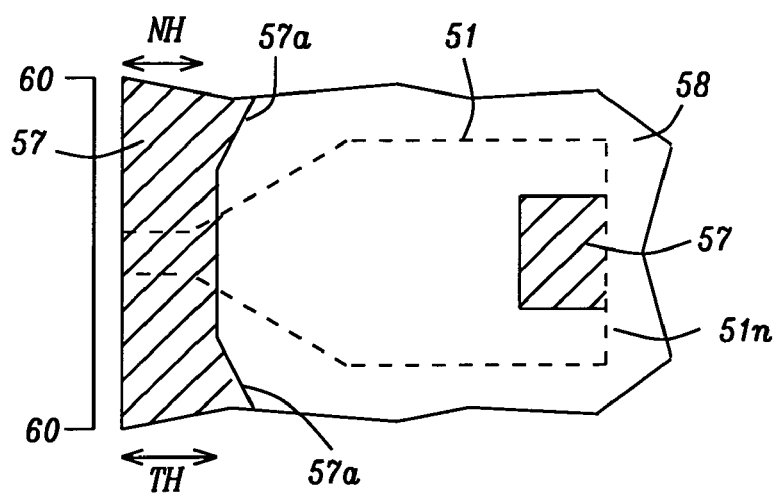
FIG. 14 is a top view of the partially formed PMR write head of the present invention following the formation of a first write shield.

From a top view in FIG. 14, a front portion of the first write shield 57 is shown with a front end along the first plane 60-60 and a back end which is generally aligned parallel to the first plane except for segments 57a on the third insulation layer 58 that may be formed a greater distance than TH from the first plane. The first write shield also has a back portion with a rectangular shape formed above the end 51n with the seed layer 55 (not shown) therebetween. However, the back portion does not typically cover the entire end 51n.

In FIGS. 15-17, the read head section 28 is intentionally removed to focus on the PMR write head structure 70. Referring to FIG. 15, the PMR write head 70 is completed by a well known sequence of steps of which the details are not described herein. In one embodiment, a second write shield 59 with a similar shape as the first write shield 57 and a thickness of about 2 to 3 microns is formed on the first write shield. A front portion of the second write shield 59 along the first plane 60-60 has a small overlap of about 0.4 microns on the third insulation layer 58. Above the third insulation layer 58 not covered by the second write shield 59 is formed a coil layer 61 that typically has a spiral shape and is wrapped around the second write shield on the back end of the main pole layer 51. The coil layer 61 has a thickness from about 2 to 3 microns and is coplanar with the second write shield 59. Between the coils in the coil layer 59 is a photoresist layer 62 that serves as an insulation layer. A fourth insulation layer (not shown) which is a 3 to 4 micron thick $Al_2O_3$ layer is deposited on the third insulation layer 58 and is planarized by a CMP process until coplanar with the second write shield 59. Following the planarization step, a fifth insulation layer 63 comprised of $Al_2O_3$ with a thickness of about 0.2 microns is formed on the coil layer 61 and photoresist layer 62. A third write shield 64 having a thickness of 2 to 3 microns is then formed on the fifth insulation layer 63 and on the second write shield 59. The third write shield 64 provides a magnetic flux connection between the second write shield 59 along the first plane 60-60 and the second write shield over the connection area.

Referring to FIG. 16, a cross-sectional view from the first plane 60-60 depicts the write head 70 after a write gap layer 54, seed layer 55, first write shield 57, second write shield 59, and third write shield 64 are sequentially formed above the pole tip 35.

The present invention is also the PMR write head depicted in FIGS. 15-17 that is fabricated by the previously described method and is comprised of a main pole layer that has a pole tip region and pole tip having an upper rectangular portion formed on a lower inverted trapezoidal portion. As illustrated in FIG. 15, there is a substrate 29 that may be an $Al_2O_3$ separation layer in a separated read-write head upon which a bottom yoke 50 with a thickness of about 3 microns is formed. The bottom yoke 50 is coplanar with a first insulation layer 30 comprised of $Al_2O_3$ that separates the bottom yoke from a first plane 60-60 which in this case is an ABS. The bottom yoke 50 is preferably comprised of CoNiFe and is recessed from the first plane 60-60 by about 1 micron.

A main pole layer 51 is formed on the bottom yoke 50 and first insulation layer 30 and has a uniform thickness of about 0.2 to 0.4 microns. The main pole layer 51 is coplanar with a second insulation layer (not shown) disposed on the first insulation layer 30. The main pole layer 51 and bottom yoke 50 may be comprised of the same magnetic material which is CoNiFe or CoFe. A key feature of the main pole layer is the shape of the pole tip 35 pictured in FIG. 8 which has been previously described. The upper rectangular portion has a width $w_3$ and a thickness $d_3$ while the inverted trapezoidal bottom portion has a width $w_4$ less than $w_3$ and a thickness c wherein the ratio $d_3/c$ is from about 0.12:1 to 0.5:1. Sides 40 on the rectangular portion are formed in a direction that is perpendicular to the substrate 29 while sides 39 on the bottom portion form an angle θ with the plane 28-28 that coincides with the bottom surface 36.

A write gap layer 54 is disposed on the main pole layer 51, pole tip region 51a, and second insulation layer 52. A portion of the back end region of the main pole layer which serves as a connection area to a first write shield 57 is not covered by the write gap layer 54. There is a seed layer 55 which may be CoNiFe that extends a distance NH from the ABS toward the back end region on the write gap layer 54. The seed layer 55 also covers the aforementioned connection area. The first write shield 57 which is comprised of CoNiFe with a thickness of about 0.5 microns has a front portion on the seed layer 55 along the ABS and a back portion on the connection area.

There is a third insulation layer 58 that may be an $Al_2O_3$ layer which is coplanar with the first write shield 57 and is formed on the write gap layer 54 not covered by the first write shield 57. A second write shield 59 is formed on the first write shield 57 and has a thickness of about 2 to 3 microns and the same composition as the first write shield 57. A front portion of the second write shield 59 along the plane 60-60 extends a distance greater than TH toward the back end of the write head and slightly overlaps the third insulation layer 58. Above the third insulation layer 58 is a coil layer 61 comprised of Cu that is coplanar with the second write shield 59. Between the coils in the coil layer 61 and adjacent to the second write shield 59 is formed a photoresist layer 62 that serves as an insulator material. The photoresist layer 62 is coplanar with the coil layer. There is a fourth insulation layer (not shown) formed adjacent to and coplanar with the second write shield 59 and a fifth insulation layer 63 with a thickness of about 0.2 microns that covers the coil layer 61 and photoresist layer 62. The fourth insulation layer and fifth insulation layer 63 may be comprised of $Al_2O_3$. The top layer in the PMR write head of the present invention is a third write shield 64 that is disposed on the second write shield 59, fourth insulation layer, and fifth insulation layer 63. The third write shield 64 is comprised of CoNiFe and has a thickness between 2 and 3 microns.

In FIG. 17, the magnetic flux path of the PMR write head of the present invention is illustrated. Only the magnetic layers and first plane 60-60 (ABS) are numbered to simply the drawing and direct attention to the magnetic flux direction. Note that the flux return pole is essentially comprised of the first write shield 57, second write shield 59, and third write shield 64. A magnetic flux 71 generated by flowing a current through the coil layer described previously passes through the bottom yoke 50 and main pole layer 51 before a first flux field 71a exits the main pole layer 51 through the pole tip region 51a at the pole tip 35 and enters a recording layer 72 and a soft underlayer 73. A second flux field 71b passes from the main pole layer 51 to the first write shield 57 and then the second write shield 59 before entering the third write shield 64. Meanwhile, the first flux field 71a enters the third write shield 64 after exiting the recording layer 72. The magnetic flux path in the third write shield 64 leads to the back end of the PMR write head 70 where the magnetic flux 71 transits the second write shield 59 and first write shield 57 (and seed layer 55) in the connection area to reach the main pole layer 51 and bottom yoke 50 once again.

While this invention has been particularly shown and described with reference to, the preferred embodiment thereof, it will be understood by those skilled in the art that various changes in form and details may be made without departing from the spirit and scope of this invention.

We claim:

1. A PMR write head formed on a substrate and with a pole tip region in a main pole layer, comprising:
   (a) an upper portion of a pole tip having two parallel sides, a top surface, and a bottom surface that form a rectangular shape adjacent to an air bearing surface (ABS) wherein a distance between the two parallel sides is a first width along the ABS and a distance between the top and bottom surfaces of the upper portion at the ABS is a first thickness;
   (b) a lower portion of the pole tip having an inverted trapezoidal shape adjacent to the ABS wherein the lower portion has a top surface that is coincident with the bottom surface of the upper portion, and a bottom surface, and two non-parallel sides such that the distance between the two non-parallel sides along the bottom surface of the lower portion is a second width along the ABS that is less than said first width along the ABS, and the distance between the top surface and bottom surface of the lower portion at the ABS is a second thickness which is greater than said first thickness, said lower portion is formed on a first insulation layer and is a lesser distance from the substrate than the upper portion;
   (c) the first insulation layer that contacts the substrate wherein said substrate separates said PMR write head from a read head;
   (d) a second insulation layer contacting said first insulation layer and adjoining the two parallel sides of said upper portion and the two non-parallel sides of said lower portion, said second insulation layer has a top surface coplanar with the top surface of the upper portion; and
   (e) a write gap layer formed on the top surface of said upper portion.

2. The pole tip region of claim 1 wherein said main pole layer is formed on a bottom yoke that is recessed from said ABS.

3. The pole tip region of claim 1 wherein said first width along the ABS is between about 0.12 and 0.16 microns.

4. The pole tip region of claim 1 wherein the first thickness of said upper portion is from about 0.04 to 0.08 microns.

5. The pole tip region of claim 1 wherein the second thickness of said lower portion is between about 0.16 to 0.32 microns.

6. The pole tip region of claim 1 wherein the second width along the ABS is about 0.04 to 0.08 microns.

7. The pole tip region of claim 1 wherein the ratio of said first thickness of said upper portion to said second thickness of said lower portion is between about 0.12:1 and 0.5:1.

8. The pole tip region of claim 1 wherein said lower portion is formed on said first insulation layer and each of said non-parallel sides intersects a top surface of said first insulation layer to form an angle of about 80 to 85 degrees.

9. The pole tip region of claim 1 wherein the top surface of said upper portion is a leading edge and said first width of the upper portion is the track width in a write operation and the bottom surface of said lower portion is a trailing edge during said write operation.

10. A PMR write head, comprising:
   (a) a bottom yoke formed on a substrate and separated from an ABS by a first insulation layer;
   (b) a main pole layer formed on said bottom yoke and first insulation layer, said main pole layer includes a pole tip region formed adjacent to said ABS wherein the pole tip region is comprised of:
      (1) an upper portion having two parallel sides, a top surface, and a bottom surface that form a rectangular shape along said ABS, wherein a distance between the two parallel sides is a first width along the ABS and a distance between the top and bottom surfaces of the upper portion at the ABS is a first thickness; and
      (2) a lower portion having an inverted trapezoidal shape adjacent to the ABS wherein the lower portion has a top surface that is coincident with the bottom surface of the upper portion, and a bottom surface, and two non-parallel sides such that the distance between the two non-parallel sides along the bottom surface of the lower portion is a second width along the ABS that is less than said first width along the ABS, and the distance between the top surface and bottom surface of the lower portion at the ABS is a second thickness;
   (c) a write gap layer in which a portion thereof is formed on said pole tip region;
   (d) a front portion of a first write shield formed on said write gap layer along said ABS and a back portion formed above the main pole layer in a back end region of the PMR write head;
   (e) a second write shield with front and back portions formed on the front and back portions, respectively, of the first write shield;
   (f) a third write shield formed on the second write shield which connects the front and back portions thereof; and
   (g) a coil layer formed coplanar with said second write shield.

11. The PMR write head of claim 10 wherein the top surface of said upper portion is a leading edge in a write operation and the first width is a track width and wherein the main pole layer has a flat upper surface which includes said leading edge.

12. The PMR write head of claim 10 wherein said first width of the upper portion is from about 0.12 to 0.16 microns.

13. The PMR write head of claim 10 wherein said first thickness of the upper portion is from about 0.04 to 0.08 microns.

14. The PMR write head of claim 10 wherein said second thickness of the lower portion is between about 0.16 and 0.32 microns.

15. The PMR write head of claim 10 wherein said second width along the ABS is from about 0.04 to 0.08 microns.

16. The PMR write head of claim 10 wherein the lower portion is formed on said first insulation layer and each of said non-parallel sides intersects said first insulation layer to form an angle of about 80 to 85 degrees.

17. The PMR write head of claim 10 wherein the main pole layer, bottom yoke, first write shield, second write shield, and third write shield are comprised of CoNiFe.

18. The PMR write head of claim 10 wherein the substrate is an $Al_2O_3$ layer that separates said PMR write head from a read head.

19. The PMR write head of claim 10 wherein the first write shield, second write shield, and third write shield serve as a flux return pole.

\* \* \* \* \*